(12) United States Patent
Suzuki et al.

(10) Patent No.: US 10,259,076 B2
(45) Date of Patent: Apr. 16, 2019

(54) DEVICE FOR MANUFACTURING LAYERED OBJECT AND METHOD OF MANUFACTURING LAYERED OBJECT

(71) Applicant: Kabushiki Kaisha Toshiba, Minato-ku (JP)

(72) Inventors: Yusuke Suzuki, Yokohama (JP); Hideshi Nakano, Yokosuka (JP); Hiroshi Ohno, Yokohama (JP); Shanying Pan, Yokohama (JP); Kotaro Kobayashi, Mie (JP); Masayuki Tanaka, Yokohama (JP); Morihiro Machida, Chuo (JP); Kazunari Iwakawa, Kawasaki (JP); Aya Watase, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 371 days.

(21) Appl. No.: 15/023,276

(22) PCT Filed: Sep. 17, 2014

(86) PCT No.: PCT/JP2014/074529
§ 371 (c)(1),
(2) Date: Mar. 18, 2016

(87) PCT Pub. No.: WO2015/151315
PCT Pub. Date: Oct. 8, 2015

(65) Prior Publication Data
US 2016/0288265 A1     Oct. 6, 2016

(30) Foreign Application Priority Data
Mar. 31, 2014   (JP) .................................. 2014-073685

(51) Int. Cl.
*B23K 26/346* (2014.01)
*B23K 26/342* (2014.01)
(Continued)

(52) U.S. Cl.
CPC .......... *B23K 26/342* (2015.10); *B22F 3/1055* (2013.01); *B23K 26/346* (2015.10);
(Continued)

(58) Field of Classification Search
CPC ........ B33Y 10/00; B33Y 30/00; B22F 3/1055
See application file for complete search history.

(56) References Cited

U.S. PATENT DOCUMENTS

| 5,096,626 A | 3/1992 | Takamizawa et al. |
| 5,647,931 A | 7/1997 | Retallick et al. |

(Continued)

FOREIGN PATENT DOCUMENTS

| JP | 1-310918 A | 12/1989 |
| JP | 5-16309 A | 1/1993 |

(Continued)

OTHER PUBLICATIONS

Notice of Rejection dated Jan. 5, 2016 in Patent Application No. 2014-073685 (with English language translation).

(Continued)

*Primary Examiner* — Ibrahime A Abraham
*Assistant Examiner* — Ahmad Abdel-Rahman
(74) *Attorney, Agent, or Firm* — Oblon, McClelland, Maier & Neustadt, L.L.P.

(57) ABSTRACT

A device for manufacturing a layered object includes a container, a vibration unit, and an energy beam irradiation unit. The container includes a stage, a wall surrounding the stage, and a lid. The vibration unit vibrates raw material powder to planarize a face of the raw material powder supplied into the container. The energy beam irradiation unit (Continued)

irradiates part of the raw material powder with an energy beam to form part of the layered object. The lid presses the raw material powder when the vibration unit vibrates the raw material powder. A space is formed between the wall and the lid in the container when the lid is in contact with the raw material powder. The raw material powder is allowed to flow into the space.

5 Claims, 10 Drawing Sheets

(51) Int. Cl.
　　*B23K 37/047*　　(2006.01)
　　*B33Y 30/00*　　(2015.01)
　　*B33Y 10/00*　　(2015.01)
　　*B29C 64/153*　　(2017.01)
　　*B29C 64/20*　　(2017.01)
　　*B22F 3/105*　　(2006.01)
　　*B22F 3/02*　　(2006.01)

(52) U.S. Cl.
　　CPC .......... *B23K 37/047* (2013.01); *B29C 64/153* (2017.08); *B29C 64/20* (2017.08); *B33Y 10/00* (2014.12); *B33Y 30/00* (2014.12); *B22F 2003/1056* (2013.01); *B22F 2999/00* (2013.01); *Y02P 10/295* (2015.11)

(56) References Cited

U.S. PATENT DOCUMENTS

| | | |
|---|---|---|
| 2006/0133947 A1 | 6/2006 | Debiccari et al. |
| 2006/0165546 A1 | 7/2006 | Yamada et al. |
| 2008/0260945 A1 | 10/2008 | Ederer et al. |
| 2012/0094026 A1 | 4/2012 | Ederer et al. |
| 2013/0064707 A1* | 3/2013 | Matsui ................ B29C 64/165 419/61 |
| 2014/0302187 A1* | 10/2014 | Pawlikowski ...... B29C 67/0085 425/174.4 |

FOREIGN PATENT DOCUMENTS

| | | | | |
|---|---|---|---|---|
| JP | 8-502703 A | | 3/1996 | |
| JP | 8-252867 A | | 10/1996 | |
| JP | 2000-336403 A | * | 5/1999 | ............ B29C 67/00 |
| JP | 2000-336403 A | | 12/2000 | |
| JP | 2006-176880 A | | 7/2006 | |
| JP | 2006-200030 A | | 8/2006 | |
| JP | 2007-522927 A | | 8/2007 | |

OTHER PUBLICATIONS

International Search Report dated Oct. 21, 2014 in PCT/JP2014/074529 Filed Sep. 17, 2014.

\* cited by examiner

DEVICE FOR MANUFACTURING LAYERED OBJECT AND METHOD OF MANUFACTURING LAYERED OBJECT

CROSS-REFERENCE TO RELATED APPLICATIONS

This application is national stage application of International Application No. PCT/JP2014/074529, filed Sep. 17, 2014, which designates the United States, incorporated herein by reference, and which is based upon and claims the benefit of priority from Japanese Patent Application No. 2014-073685, filed Mar. 31, 2014, the entire contents of each of which are incorporated herein by reference.

FIELD

Embodiments described herein relate generally to a device for manufacturing a layered object and a method for manufacturing a layered object.

BACKGROUND

An illustrative device for manufacturing a layered object supplies a raw material and simultaneously melts the raw material by heating with laser so as to form a shaped object having a desired shape. Such a manufacturing device is desired to perform a high-speed shaping operation. In addition, the manufacturing device is desired to have an improved productivity.

SUMMARY

According to an embodiment, in general, a device for manufacturing a layered object, the device comprises a container, a vibration unit, and an energy beam irradiation unit. The container includes a stage, a wall surrounding the stage and a lid. The vibration unit vibrates raw material powder to planarize a face of the raw material powder supplied into the container. The energy beam irradiation unit irradiates part of the raw material powder with an energy beam to form part of the layered object. The lid presses the raw material powder when the vibration unit vibrates the raw material powder. A space is formed between the wall and the lid in the container when the lid is in contact with the raw material powder. The raw material powder is allowed to flow into the space.

DETAILED DESCRIPTION

Embodiments will be described below with reference to the accompanying drawings.

The drawings are schematic or conceptual. The relation between the thickness and width of each part and the dimensional proportion of parts, for example, are not necessarily identical to those in reality. The same part may be illustrated in different sizes and proportions between drawings.

In the specification and drawings of the present application, the same elements as those have already been described with reference to a drawing are denoted by identical reference symbols, and a detailed description thereof is omitted as appropriate.

[First Embodiment]

Figure 1:
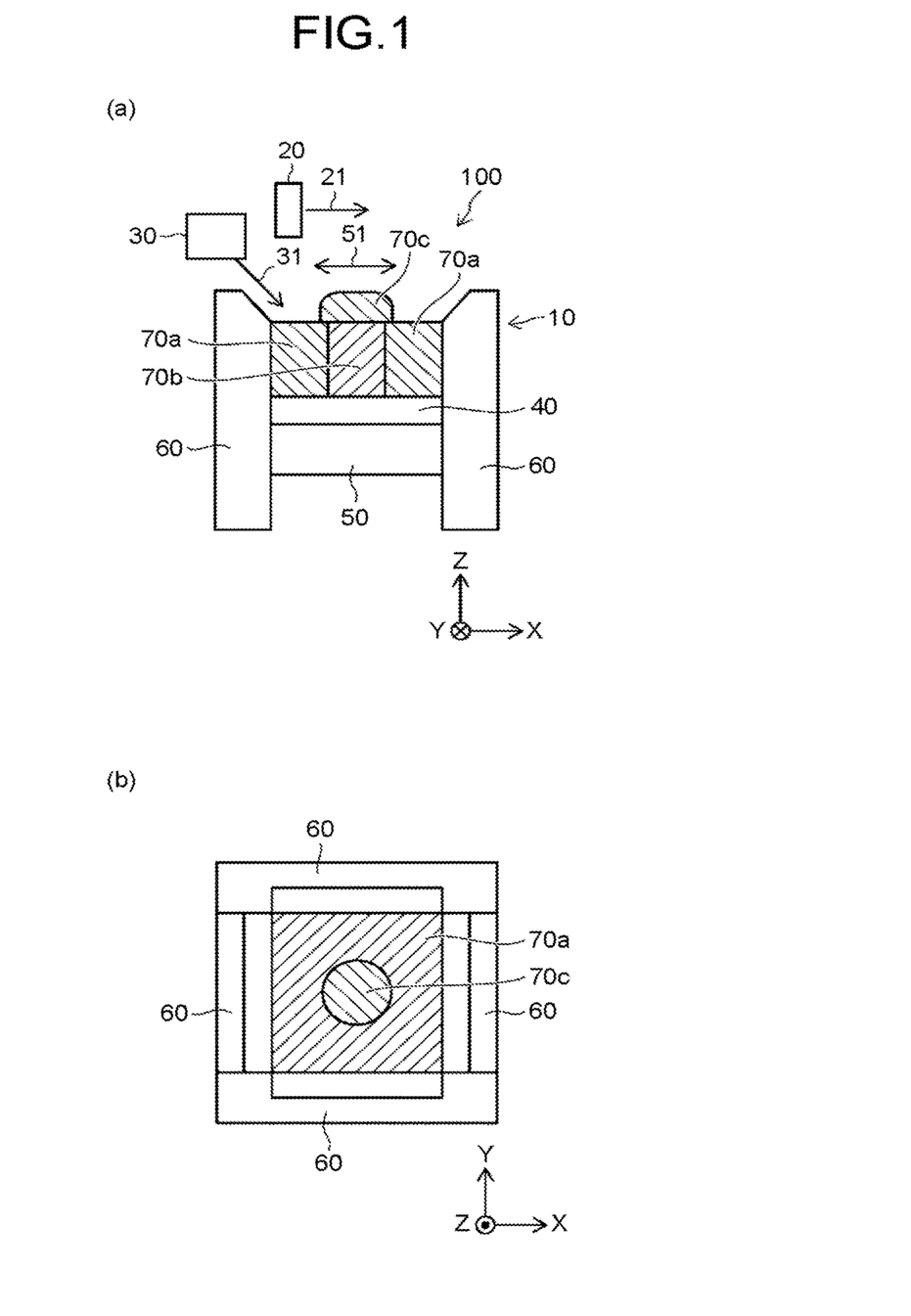
FIGS. 1A and 1B are each a diagram for illustrating a device for manufacturing a layered object according to a first embodiment.

FIGS. 1A and 1B are each a diagram for illustrating a device for manufacturing a layered object according to a first embodiment.

FIG. 1A is a schematic sectional view. FIG. 1B is a schematic top view.

Figure 2:
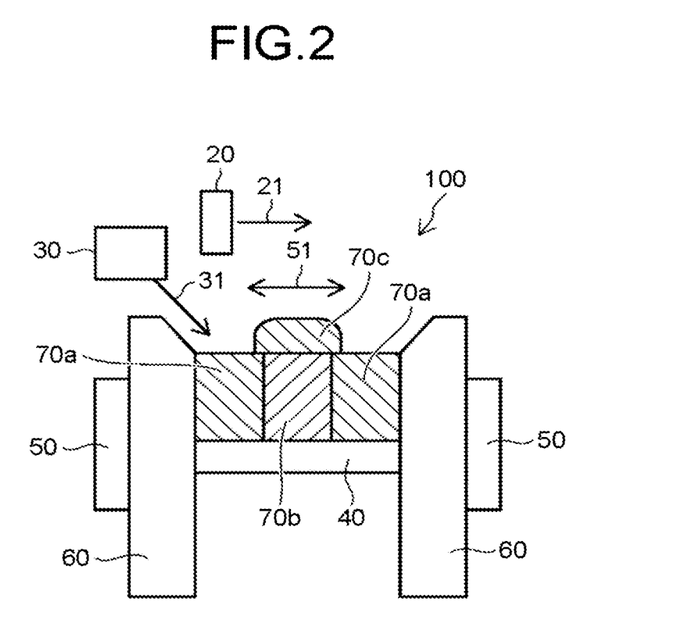
FIG. 2 is a schematic sectional view for illustrating another manufacturing device according to the first embodiment.

FIG. 2 is a schematic sectional view for illustrating another manufacturing device according to the first embodiment.

This manufacturing device 100 according to the present embodiment is provided with a container 10, an energy beam irradiation unit 20, a raw material supplying unit 30, and a vibration unit 50. The container 10 is, for example, a powder tank.

The container 10 includes a stage 40 and a wall 60 surrounding the stage 40. The raw material supplying unit 30 supplies raw material powder 31 into the container 10. In this example, the raw material supplying unit 30 supplies the raw material powder 31 onto the stage 40. The energy beam irradiation unit 20 moves relative to the stage 40 in an X axis direction and a Y axis direction including the direction of an arrow 21 so as to irradiate, with an energy beam, part of the raw material powder 31 supplied on the stage 40. The material irradiated with the energy beam is melted and solidified to form part of a layered object. In this manner, the energy beam irradiation unit 20 forms a powder region 70a (uncured raw material powder) and a cured region 70b (the part of the layered object). Accordingly, each of a plurality of layers that constitute the layered object is sequentially formed.

The raw material powder 31 is, for example, a metal such as steel and stainless steel. The raw material powder 31 may be ceramic or resin. Alternatively, the raw material powder 31 may be a mixture of metal and ceramic. The raw material powder 31 has an average particle size of, for example, equal to or larger than 1 μm and equal to or smaller than 100 μm, more preferably, equal to larger than 10 μm and equal to or smaller than 50 μm.

The energy beam irradiation unit 20 irradiates part of the raw material powder 31 on the stage 40 with an energy beam in accordance with the shape of the layered object. The energy beam is, for example, laser light (carbon dioxide laser or YAG laser, for example). In the present embodiment, laser light is used as the energy beam, but any energy beam that can melt the material as the laser light does is applicable. The energy beam may be, for example, an electron hem, microwaves, or electromagnetic waves in the ultraviolet region. Each of a plurality of layers included in the layered object is formed by supplying the raw material powder 31 and simultaneously heating the raw material powder 31 with the energy beam. These processes are repeated more than once to form a desired layered object.

In a reference example using raw material powder, planarization using a jig called a squeegee is performed in some cases. The moving speed of the squeegee is slow, so that shaping takes a longer time.

The present embodiment, however, provides the vibration unit in place of the squeegee. The vibration unit vibrates the raw material powder so as to achieve a fast planarization. This achieves a high-speed shaping operation. Accordingly, an improved productivity can be achieved.

As illustrated in FIGS. 1A, 1B, and 2, the raw material powder 31 supplied onto the stage 40 from the raw material supplying unit 30 is not flat. The raw material powder 31 has a local cluster on the stage 40 and is shaped as convex raw material powder 70c. The raw material powder 70c is illustrated in an exaggerated manner for easier understanding, but formed as a plurality of concavities and convexities in reality. Thus, planarization of the raw material powder 70c (the surface of the raw material powder 70c) is required before irradiation with an energy beam. In the present embodiment, the planarization is performed by using the vibration unit 50 in place of the above-described squeegee. The vibration unit 50 planarizes the surface of the raw material powder 70c by vibrating the raw material powder 70c on the stage 40.

The installation position of the vibration unit 50 is not limited to a particular position. The vibration unit 50 may be integrally provided with the container 10. The vibration unit 50 may be provided outside of the container 10. The vibration unit 50 is provided below, for example, the stage 40, as illustrated in FIG. 1A. The vibration unit 50 may be provided to the wall 60 as illustrated in FIG. 2. The vibration unit 50 applies, for example, sound waves so as to directly or indirectly vibrate the raw material powder 70c. A condition such as the frequency of the applied sound waves may be set in accordance with the mass and density of the used raw material powder as appropriate. The sound waves preferably have a frequency of 10 to 20 Hz, for example. The vibration unit 50 is not limited to the vibration method with the sound waves and may employ other methods.

The vibration unit 50 vibrates, for example, the stage 40 so as to vibrate the raw material powder 70c through the stage 40. The vibration unit 50 vibrates the wall 60 so as to vibrate the raw material powder 700 through the wall 60. The vibration unit 50 vibrates the stage 40 and the wall 60 so as to vibrate the raw material powder 70c through the stage 40 and the wail 60. The vibration direction of the raw material powder 70c is not limited to a particular direction, but is, for example, along the X-Y plane direction as illustrated with an arrow 51. The vibration direction of the raw material powder 70c may include a component in a axis direction.

The wall 60 is provided around the stage 40. The wall 60 includes a side wall of the container 10. As an example of the wall 60, four side walls are provided around the stage 40. In this example, part of the wall 60 in touch with a powder top layer is tapered, for example. When the surface of the raw material powder 70c is planarized, this tapered part allows the planarized raw material powder to escape.

FIGS. 3A to 3E are each a schematic sectional view for illustrating a method of manufacturing a layered object according to the first embodiment.

Figure 3:
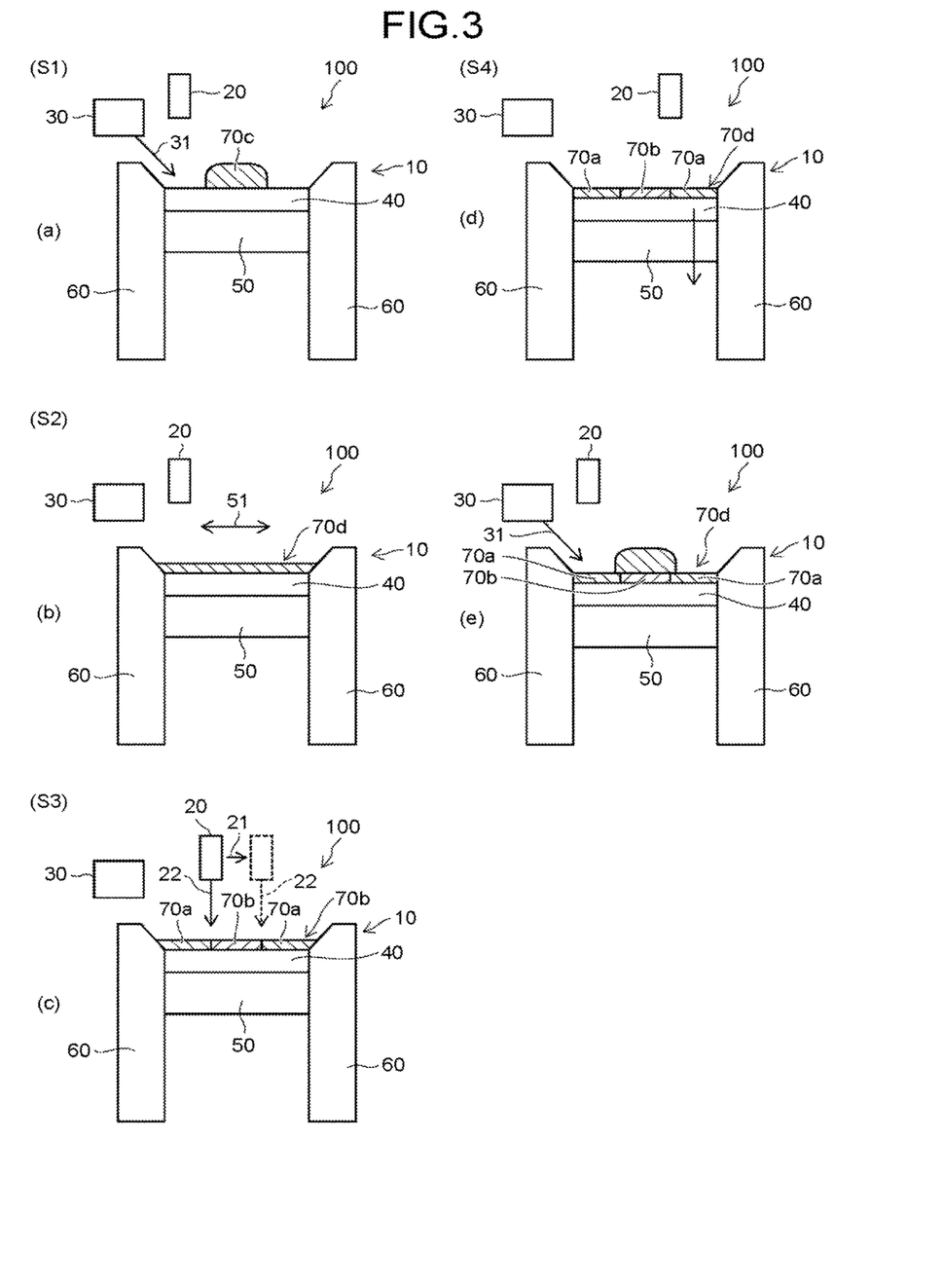
FIGS. 3A to 3E are each a schematic sectional view for illustrating a method of manufacturing a layered object according to the first embodiment.

As illustrated in FIG. 3A, the raw material supplying unit 30 supplies the raw material powder 31 onto, for example, the stage 40 in the container 10 (step S1; corresponding to a first process). At this step, the surface of the raw material powder 31 supplied onto the stage 40 is not planarized, and the raw material powder is formed as the raw material powder 70c including a plurality of concavities and convexities.

As illustrated in FIG. 3B, the vibration unit 50 operates to vibrate the raw material powder 70c on the stage 40 in, for example, the horizontal direction (the X-Y plane direction) indicated by the arrow 51, planarize the surface of the raw material powder 70c, and form raw material powder 70d (step S2; corresponding to a second process). As illustrated in FIG. 3C, the energy beam irradiation unit 20 irradiates, with an energy beam 22, part of the raw material powder 70d obtained by planarizing the surface of the raw material powder 70c at step S2. The energy beam irradiation unit 20 forms part of a layered object as the raw material powder 70d irradiated with the energy beam 22 (step S3; corresponding to a third process). Specifically, the energy beam irradiation unit 20 moves relative to the stage 40 in the X-Y plane direction including the direction of the arrow 21, while irradiating part of the raw material powder 70d with the energy beam 22. In this manner, the energy beam irradiation unit 20 forms the powder region 70a (uncured raw material powder) and the cured region 70b (the part of the layered object).

After the part (a layer) of the layered object has been formed at step S3, the stage 40 is moved down relative to the wall 60 by a predetermined distance (step S4; corresponding to a fourth process) as illustrated in FIG. 3D. One layer of the layered object is formed through the processing at steps S1 to S4. At the formation of the next layer of the layered object, as illustrated in FIG. 3E, the raw material supplying unit 30 supplies the raw material powder 31 onto the raw material powder 70d in which the powder region 70a and the cured region 70b are formed. Thereafter, the same processing is repeated. In this manner, a desired layered object can be obtained.

Figure 4:
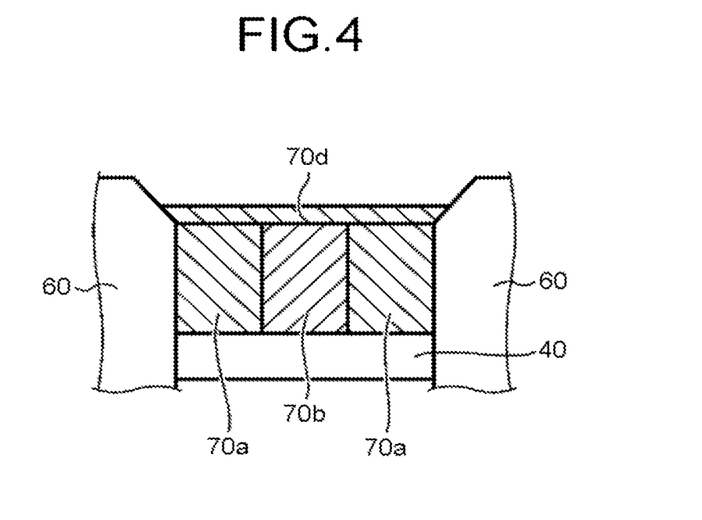
FIG. 4 is a schematic partial diagram for illustrating a state in which the surface of raw material powder is planarized according to the first embodiment.

FIG. 4 is a schematic partial diagram for illustrating a state in which the surface of the raw material powder 70c is planarized.

FIG. 4 omits illustrations of the vibration unit 50, the energy beam irradiation unit 20, the raw material supplying unit 30, and the raw material powder 70c. Before the irradiation with an energy beam by the energy beam irradiation unit 20, the vibration unit 50 is operated to generate vibration onto the raw material powder 70c. In other words, the vibration provided to the raw material powder 70c by the vibration unit 50 planarizes the surface of the raw material powder 70c to form the raw material powder 70d.

The energy beam irradiation unit 20 irradiates, with an energy beam, part of the raw material powder 70d planarized as illustrated in FIG. 4. This forms the powder region 70a (uncured raw material powder) and the cured region 70b (the part of the layered object) as illustrated in FIG. 3C. The stage 40 is moved down each time part of the layered object has been formed by the energy beam irradiation unit 20. The raw material supplying unit 30 supplies the raw material powder 31 onto the stage 40 each time the stage 40 has been moved down. This processing is repeated to form a desired layered object.

In other words, the vibration unit 50 planarizes the surface of the raw material powder 70c by vibrating the raw material powder 70c supplied onto the stage 40 by the material supplying unit 30, thereby forming the material powder 70d in FIG. 4. After the energy beam irradiation unit 20 has formed part of the layered object in the raw material powder 70d, the stage 40 is moved down. The raw material supplying unit 30 supplies the raw material powder 31 onto the stage 40 thus moved down. Then, the vibration unit 50 planarizes the surface of the raw material powder 70c by vibrating the raw material powder 70c supplied onto the stage 40 thus moved down, thereby forming the raw material powder 70d. The energy beam irradiation unit 20 forms another part of the layered object in the raw material powder 70d.

According to the present embodiment, the vibration unit is provided in place of the squeegee to achieve a fast planarization. This achieves a high-speed shaping operation. Since the squeegee is not used, any waste of the raw material powder can be reduced. Accordingly, an improved productivity can be achieved.

[Second Embodiment]

Figure 5:
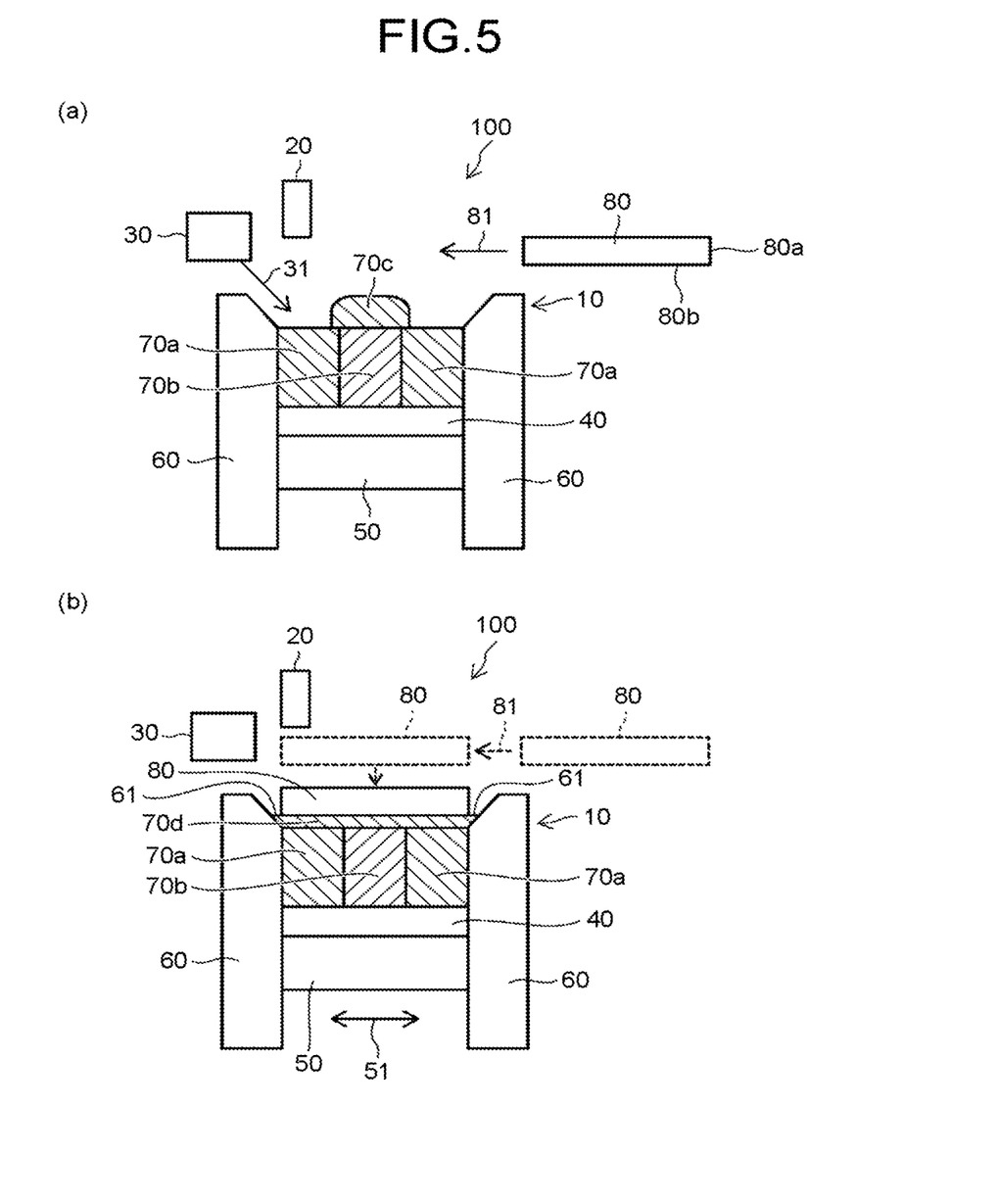
FIGS. 5A and 5B are each a diagram for illustrating a device for manufacturing a layered object according to a second embodiment.

FIGS. 5A and 5B are each a diagram for illustrating a device for manufacturing a layered object according to a second embodiment.

Figure 6:
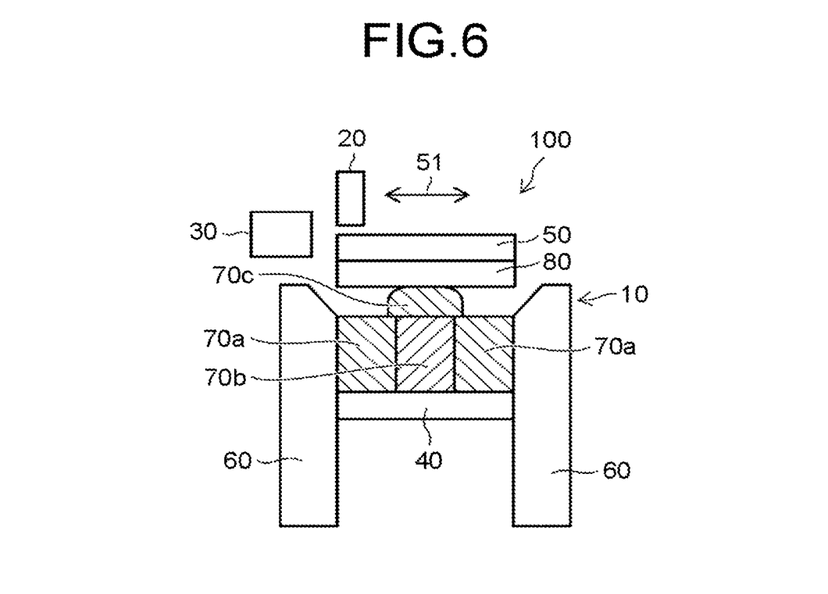
FIG. 6 is a schematic sectional view for illustrating another manufacturing device according to the second embodiment.

FIG. 6 is a schematic sectional view for illustrating another manufacturing device according to the second embodiment.

In the manufacturing device 100 according to the present embodiment, the container 10 is provided with an openable and closable lid 80. FIG. 5A illustrates a state in which the lid 80 is open. FIG. 5B illustrates a state in which the lid 80 is closed. In this example, the lid 80 moves in the direction of an arrow 81 to press the raw material powder 70c on the stage 40.

As illustrated in FIG. 5B, when the raw material powder 70c is vibrated in the direction of the arrow 51 by the vibration unit 50, the lid 80 is placed on, for example, the raw material powder 70c (the state in which the lid 80 is closed), pressing the raw material powder 70c. In other words, the raw material powder 70c is provided with the pressing by the lid 80 in addition to the vibration by the vibration unit 50. The material of the lid 80 is not limited to a particular material. The material of the lid 80 preferably has a relatively smooth surface characteristic. The material of the lid 80 is glass, for example. The material of the lid 80 is resin, for example. The material of the lid 80 may be a metal. Being pressed by the lid 80, the raw material powder 70c has fewer concavities and convexities than those in the first embodiment. Thus, the surface of the raw material powder 70c can be planarized.

At the irradiation with an energy beam by the energy beam irradiation unit 20, the lid 80 is placed at a position not overlapping the raw material powder 70c. The lid 80 is not placed on or above the raw material powder 70c (the state in which the lid 80 is open). In other words, the lid 80 is retracted to a predetermined position so as not to disturb the irradiation with an energy beam.

In this example, the lid 80 is moved outside of the wall 60 at the irradiation with an energy beam. The movement of the lid 80 is not limited thereto and has various patterns. The lid 80 may be placed at a 70c overlapping the raw material powder 70c. For example, the lid 80 may be disposed above the raw material powder 70c with a small space therebetween. In other words, the lid 80 is disposed floating slightly above the raw material powder 70c. This space may have a size enough to allow any fume to escape. The lid 80 is a material (glass, for example) that transmits laser light. The use of such a material can eliminate a time required for the movement of the lid 80.

At the irradiation with an energy beam, the lid 80 may be moved outside of an area to be shaped. In this case, since the lid 80 is retracted from an area to be irradiated with laser, the influence of any fume is reduced similarly to the case in which the lid 80 is retracted outside of the wall 60.

Being in contact with the raw material powder 70c, the lid 80 may adsorb the raw material powder 70c due to static electricity, for example. For this reason, the lid 80 is preferably treated to prevent adhesion of the raw material powder 70c. For example, the lid 80 is preferably provided with an antistatic film 80b. In other words, the lid 80 includes a plate 80a, and the antistatic film 80b arranged between the plate 80a and the raw material powder 70c. The antistatic flits may be made of, for example, a surfactant, a conductive polymer, a resin in which conductive particles such as carbon black and silver are dispersed, a siloxane resin, or a siloxane material. For example, a static electricity removing device such as an ionizer may be used to neutralize the entire lid 80.

As illustrated in FIG. 5B, when the lid 80 and the raw material powder 70d are in contact with each other, the container 10 has a space (a groove) 61 formed between the wall 60 and the lid 80. This allows the raw material powder 70d to flow into the space 61. Specifically, the part of the wall 60 in touch with the powder top layer is tapered. This tapered part allows formation of the space 61 between the wall 60 and the lid 80. When the surface of the raw material powder 70c is planarized to form the raw material powder 70d, the raw material powder 70d can escape into the space 61.

As illustrated in FIG. 6, the vibration unit 50 may be provided to the lid 80. In this example, the vibration unit 50 is provided on the upper side of the lid 80. Accordingly, the vibration unit 50 vibrates the lid 80 in the X-Y plane direction so as to vibrate the raw material powder 70c through the lid 80. The lid 80 may be moved in the Z axis direction in addition to the X-Y plane direction.

According to the present embodiment, the vibration unit 50 and the lid 80 are provided in place of the squeegee to achieve a faster planarization. This achieves a high-speed shaping operation. Since the squeegee is not used, any waste of the raw material powder can be reduced. Accordingly, an improved productivity can be achieved.

[Third Embodiment]

Figure 7:
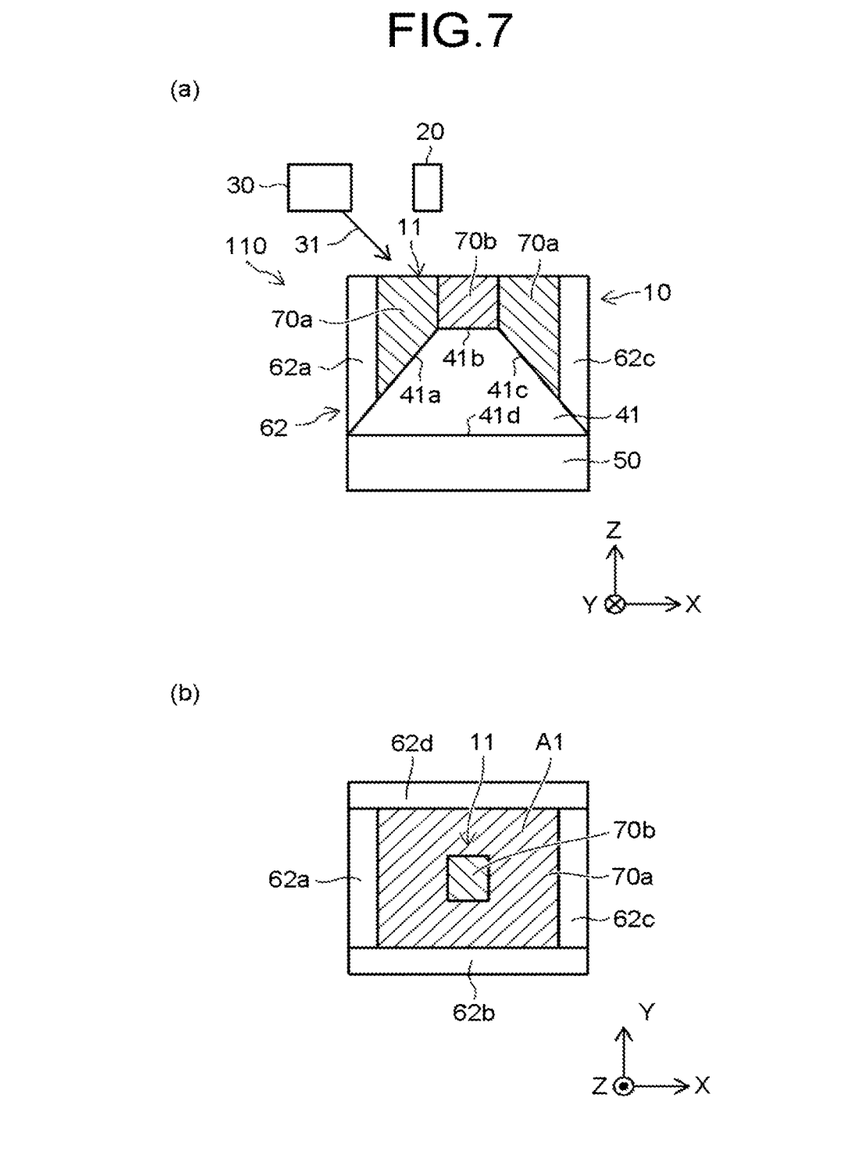
FIGS. 7A and 7B are each a diagram for illustrating a device for manufacturing a layered object according to a third embodiment.

FIGS. 7A and 7B are each a diagram for illustrating a device for manufacturing a layered object according to a third embodiment.

FIG. 7A is a schematic sectional view. FIG. 7(b) is a schematic top view. A manufacturing device 110 is provided with the container 10, the energy beam irradiation unit 20, the raw material supplying unit 30, and the vibration unit 50. The container 10 includes a stage 41 and a wall 62 surrounding the stage 41. The container 10 has an inner chamber 11 enclosed by the stage 41 and the wall 62.

The stage 41 includes an upper face 41b. The wall 62 includes four side walls 62a to 62d. Specifically, the wall 62 includes the first side wall 62a and the second side wall 62c opposite to the first side wall 62a. The first side wall 62c is separate from the first side wall 62a in a first direction (the horizontal direction) parallel to the upper face 41b. The upper face 41b of the stage 41 is arranged between the first side wall 62a and the second side wall 62c. The distance between the first side wall 62a and the second side wall 62c is changeable. Thus, a sectional area A1 of a space enclosed by the wall 62 and parallel to the upper face 41b of the stage 41 is changeable with the change in the distance.

The stage 41 further includes a lower face 41d, a first side face 41a, and a second side face 41c separate from the first side face 41a in the first direction (the horizontal direction). The first side face 41a is connected with part of the upper face 41b and part of the lower face 41d. The second side face 41c is connected with another part of the upper face 41b and another part of the lower face 41d. The length of the upper face 41b in the first direction (the horizontal direction) from the first side wail 62a toward the second side wall 62c is smaller than that of the lower face 41d in the first direction (the horizontal direction).

The following describes a manufacturing method with reference to FIGS. 8A, 8B, 9, and 10.

Figure 8:
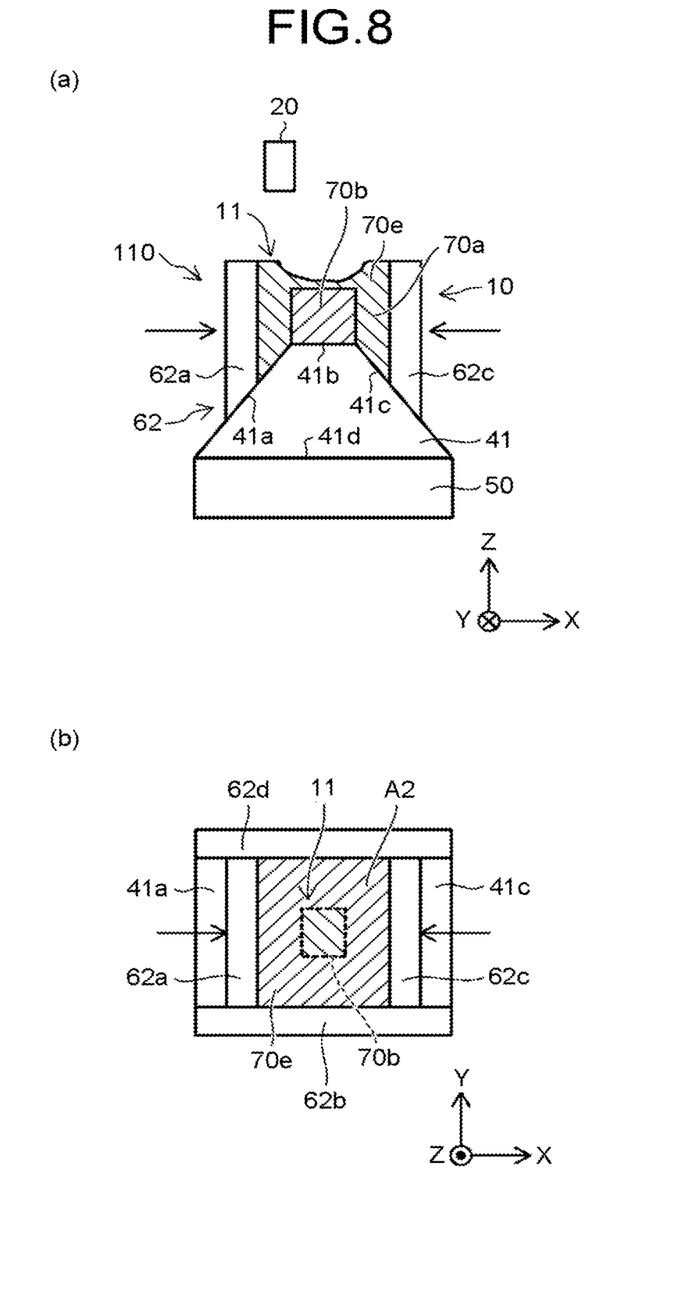
FIGS. 8A and 8B are each a diagram for illustrating a state of the manufacturing device when a pair of side walls is moved relative to a stage according to the third embodiment.

FIGS. 8A and 8B are each a diagram for illustrating a state of the manufacturing device when a pair of side walls are moved relative to the stage.

FIG. 8A is a schematic sectional view, and FIG. 8B is a schematic top view.

In the manufacturing device 110 illustrated in FIGS. 7A and 7B, after part (the cured region 70b) of a layered object is formed by the energy beam irradiation unit 20, the first side wall 62a and the second side wall 62c move toward the center of the container 10 so as to reduce the sectional area A1. In other words, the first side wall 62a and the second side wall 62c move closer to each other.

As illustrated in FIGS. 8(a) and 8(b), the first side face 41a is tilted relative to the upper face 41b. The second side face 41c is tilted relative to the upper face 41b. The first side wall 62a moves while being in contact with the first side face 41a. The second side wall 62c moves while being in contact with the second side face 41c. In other words, the first side wall 62a and the second side wall 62c only need to move relative to the stage 41. The first side wall 62a and the second side wall 62c move closer to each other along with the moving down of the stage 41.

Along with the movement of the first side wall 62a and the second side wall 62c, raw material powder 70e accumulated in an upper part of the inner chamber 11 is supplied onto on a layer (the powder region 70a and the cured region 70b) of the raw material powder including the part of the layered object. Specifically, the movement of the first side wall 62a and the second side wall 62c pushes upward the raw material powder accumulated in the upper part of the inner chamber 11. The raw material powder thus pushed upward flows toward the center (that is, the cured region 70b) of the inner chamber 11. As a result, the raw material powder 70e is supplied onto the layer (the powder region 70a and the cured region 70b) of the raw material powder including the part of the layered object.

In other words, in a first duration in which the distance between the first side wall 62a and the second side wall 62c has a first length, the vibration unit 50 planarizes the face of the raw material powder by vibrating the raw material powder on the stage 41. The energy beam irradiation unit 20 forms a first part of the layered object.

In a second duration after the first duration, the distance between the first side wall 62a and the second side wall 62c has a second length smaller than the first length. In the second duration, the raw material powder having an amount corresponding to a difference between the second length and the first length is arranged on the first part of the layered object.

In the second duration, the vibration unit 50 planarizes he face of the raw material powder by vibrating raw material powder of the first part of the layered object. The energy beam irradiation unit 20 forms a second part of the layered object.

As a result of moving the first side wall 62a and the second side wall 62c as described above, a sectional area A2 illustrated in FIG. 8B is smaller than the sectional area A1 in FIG. 7B. The space enclosed by the wall 62 preferably has a constant effective volume. As described above, the raw material powder 70e for forming part of the layered object can be supplied through the movement of the first side wall 62a and the second side wall 62c. In the present embodiment, the first side wall 62a and the second side wall 62c are moved. The embodiment is, however, not limited thereto. For example, the third side wall 62b and the fourth side wall 62d may be simultaneously moved.

In the first and the second embodiments described above, the raw material powder is supplied from the raw material supplying unit 30 at each irradiation with an energy beam.

In the present embodiment, however, the raw material supplying unit 30 supplies the raw material powder all at once, and thereafter, side walls are moved at each irradiation with an energy beam. The movement of the side walls pushes upward raw material powder accumulated in the upper part of the inner chamber, and this pushed raw material powder is used to form the next layer of the layered object.

Figure 9:
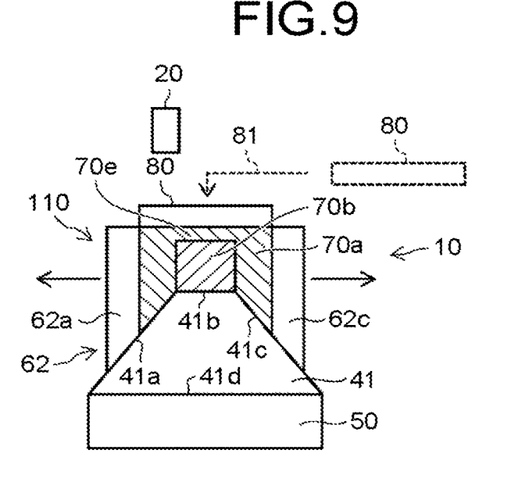
FIG. 9 is a schematic sectional view for illustrating a planarization in the manufacturing device according to the third embodiment.

FIG. 9 is a schematic sectional view for illustrating a planarization in the manufacturing device 110.

In this example, the planarization is performed by using both the vibration unit 50 and the lid 80. In this embodiment, the planarization may be performed by the vibration unit 50. The raw material powder 70e tends to have convex elevation at an outer part (refer to FIG. 8(a) Thus, the first side wall 62a and the second side wall 62c are moved outward from the container 10 by a predetermined distance so as to planarize the convex elevation at the outer part to some extent. Simultaneously, the vibration unit 50 is operated to vibrate the raw material powder 70e and press the raw material powder 70e with the lid 80. This planarizes the face of the raw material powder 70e.

Figure 10:
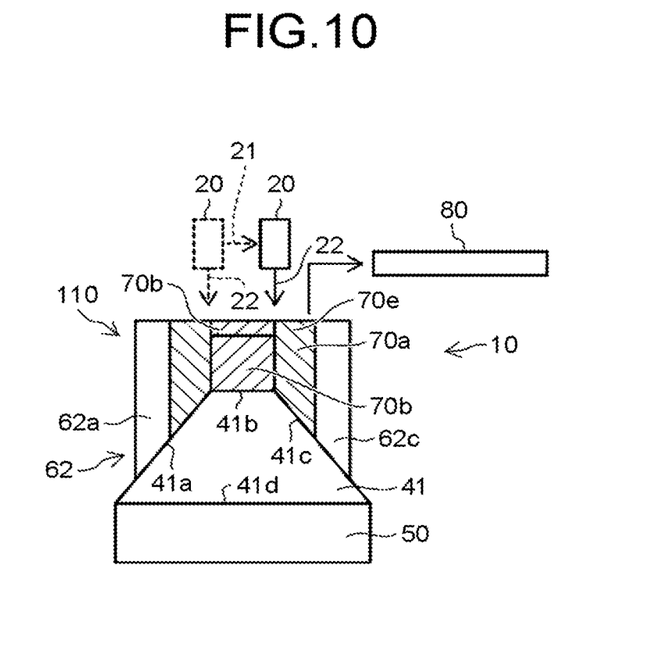
FIG. 10 is a schematic sectional view for illustrating an irradiation with an energy beam in the manufacturing device according to the third embodiment.

FIG. 10 is a schematic sectional view for illustrating an irradiation with an energy beam in the manufacturing device 110. The energy beam irradiation unit 20 is moved in the direction of the arrow 21 while irradiating, with the energy beam 22, the raw material powder 70e planarized through the planarization illustrated in FIG. 9. This forms the cured region 70b in the raw material powder 70e. The processing described with reference to FIGS. 8A, 8B, 9 and 10 is repeated to obtain a desired layered object.

According to the present embodiment, the necessary amount of raw material powder is first supplied all at once, and thereafter, no raw material powder is supplied. This can reduce any waste of the raw material powder.

In the third embodiment, the planarization is performed by the vibration unit (and the lid). In the example illustrated in FIGS. 7A, 7B, 8A, 8B, 9, and 10, the vibration unit may be omitted. In these examples, the lid may be omitted.

In the first to the third embodiments, another planarization unit such as the squeegee may be further provided.

The embodiments can provide a highly productive device for manufacturing a layered object and a method for manufacturing the same.

The embodiments of the present invention have been described above with reference to the specific examples. However, the present invention is not limited to these specific examples. For example, specific configurations of elements such as the container, the vibration unit, and the energy beam irradiation unit included in the manufacturing device are included in the scope of the present invention as long as the skilled person in the art can embody the present invention in the same or similar manner with the same or similar advantageous effects by making appropriate selections from the well-known range.

In addition, any technologically feasible combination of any two or more of elements in each specific example is included in the scope of the present invention as long as the combination contains the gist of the present invention.

Moreover, any device for manufacturing a layered object and any method for manufacturing the same that can be achieved by the skilled person in the art through design change as appropriate based on the device for manufacturing a layered object and the method for manufacturing the same described above as the embodiments of the present invention, and that contain the gist of the present invention, belong to the scope of the present invention.

It is understood that various modifications and corrections that would be thought of by the skilled person in the art in the category of the concept of the present invention belong to the scope of the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A device for manufacturing a layered object, the device comprising:

a container including a stage and a wall surrounding the stage;

a vibration unit that vibrates raw material powder to planarize a face of the raw material powder supplied into the container; and an energy beam irradiation unit that irradiates part of the raw material powder with an energy beam to form part of the layered object, wherein the stage further includes an upper face, the wall includes a first side wall, and a second side wall separate from the first side wall in a first direction parallel to the upper face, the upper face is arranged between the first side wall and the second side wall, and a distance between the first side wall and the second side wall is changeable;

wherein the stage further includes a lower face, a first side face connected with part of the upper face and part of the lower face, and a second side face separate from the first side face in the first direction and connected with another part of the upper face and another part of the lower face, a length of the upper face in the first direction is smaller than a length of the lower face in the first direction, the first side face is tilted relative to the upper face, the second side face is tilted relative to the upper face, the first side wall moves while being in contact with the first side face, and the second side wall moves while being in contact with the second side face.

2. The device for manufacturing a layered object according to claim 1, wherein the container further includes a lid, and the lid is configured to press the raw material powder when the vibration unit vibrates the raw material powder.

3. The device for manufacturing a layered object according to claim 2, wherein the lid is placed at a position not overlapping the raw material powder at the irradiation with the energy beam.

4. The device for manufacturing a layered object according to claim 2, wherein the vibration unit vibrates the lid.

5. The device for manufacturing a layered object according to claim 1, wherein the vibration unit is configured to vibrate the stage or the wall.

* * * * *